US009024927B2

(12) United States Patent
Koyama

(10) Patent No.: US 9,024,927 B2
(45) Date of Patent: May 5, 2015

(54) DISPLAY DEVICE AND METHOD FOR DRIVING THE SAME

(75) Inventor: Jun Koyama, Sagamihara (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 286 days.

(21) Appl. No.: 13/483,076

(22) Filed: May 30, 2012

(65) Prior Publication Data

US 2012/0320011 A1  Dec. 20, 2012

(30) Foreign Application Priority Data

Jun. 15, 2011 (JP) ................. 2011-133333

(51) Int. Cl.
| G09G 5/00 | (2006.01) |
| G09G 3/36 | (2006.01) |
| H04N 13/04 | (2006.01) |
| G09G 3/00 | (2006.01) |
| G09G 3/20 | (2006.01) |

(52) U.S. Cl.
CPC ........... *H04N 13/0409* (2013.01); *G09G 3/003* (2013.01); *G09G 3/20* (2013.01); *G09G 2330/021* (2013.01); *H04N 13/0454* (2013.01); *H04N 13/0456* (2013.01); *H04N 13/0468* (2013.01); *H04N 13/0477* (2013.01)

(58) Field of Classification Search
CPC ............. G09G 3/36; G09G 3/34; G09G 3/20; G09G 3/038; H04N 5/222; H04N 13/04
USPC ........................ 345/55, 102, 690, 698; 348/51
See application file for complete search history.

(56) References Cited

U.S. PATENT DOCUMENTS

| 2,883,906 A | 4/1959 | Rehorn |
| 3,191,493 A | 6/1965 | Mainardi et al. |
| 3,586,592 A | 6/1971 | Cahn |
| 4,329,019 A | 5/1982 | Okoshi et al. |
| 4,872,750 A | 10/1989 | Morishita |

(Continued)

FOREIGN PATENT DOCUMENTS

| CN | 101938666 | 1/2011 |
| JP | 08-036145 A | 2/1996 |

(Continued)

OTHER PUBLICATIONS

Ives.H, "The Chromolinoscope Revived," J.O.S.A., Jun. 1, 1930, pp. 343-353.

(Continued)

*Primary Examiner* — Andrew Sasinowski
(74) *Attorney, Agent, or Firm* — Eric J. Robinson; Robinson Intellectual Property Law Office, P.C.

(57) ABSTRACT

To suppress the increase in power consumption and suppress the decrease in display quality of a display device capable of displaying 3D images, whether each of optical shutters arranged in a matrix is brought into a light-transmitting state or a light-blocking state is selected in accordance with a voltage between a pair of electrodes (a first electrode and a second electrode) of the optical shutter. By control of the voltage between the pair of electrodes, a parallax barrier can be selectively formed in an intended region. Thus, a parallax barrier can be formed only in a region where 3D images are to be displayed.

17 Claims, 6 Drawing Sheets

(56) References Cited

U.S. PATENT DOCUMENTS

| | | | |
|---|---|---|---|
| 4,945,407 A | 7/1990 | Winnek | |
| 4,957,351 A | 9/1990 | Shioji | |
| 4,959,641 A | 9/1990 | Bass et al. | |
| 5,113,285 A | 5/1992 | Franklin et al. | |
| 5,132,820 A | 7/1992 | Someya et al. | |
| 5,132,839 A | 7/1992 | Travis | |
| 5,162,897 A | 11/1992 | Jitsukata et al. | |
| 5,239,372 A | 8/1993 | Lipton | |
| 5,315,377 A | 5/1994 | Isono et al. | |
| 5,410,345 A | 4/1995 | Eichenlaub | |
| 5,465,175 A | 11/1995 | Woodgate et al. | |
| 5,493,427 A | 2/1996 | Nomura et al. | |
| 5,541,642 A | 7/1996 | Ashbey | |
| 5,563,621 A | 10/1996 | Silsby | |
| 5,602,658 A | 2/1997 | Ezra et al. | |
| 5,640,273 A | 6/1997 | Hamagishi et al. | |
| 5,663,831 A | 9/1997 | Mashitani et al. | |
| 5,666,226 A | 9/1997 | Ezra et al. | |
| 5,777,700 A | 7/1998 | Kaneko et al. | |
| 5,880,704 A | 3/1999 | Takezaki | |
| 5,883,739 A | 3/1999 | Ashihara et al. | |
| 5,917,562 A | 6/1999 | Woodgate et al. | |
| 5,959,664 A | 9/1999 | Woodgate | |
| 6,014,164 A | 1/2000 | Woodgate et al. | |
| 6,049,424 A | 4/2000 | Hamagishi | |
| 6,118,584 A | 9/2000 | Van Berkel et al. | |
| 6,188,518 B1 | 2/2001 | Martin | |
| 6,317,175 B1 | 11/2001 | Salerno et al. | |
| 6,377,230 B1 | 4/2002 | Yamazaki et al. | |
| 6,597,348 B1 | 7/2003 | Yamazaki et al. | |
| 6,882,012 B2 | 4/2005 | Yamazaki et al. | |
| 7,145,536 B1 | 12/2006 | Yamazaki et al. | |
| 7,158,278 B2 * | 1/2007 | Kastalsky | 359/290 |
| 7,193,593 B2 | 3/2007 | Koyama et al. | |
| 7,224,339 B2 | 5/2007 | Koyama et al. | |
| 7,268,756 B2 | 9/2007 | Koyama et al. | |
| 7,317,438 B2 | 1/2008 | Yamazaki et al. | |
| 7,385,579 B2 | 6/2008 | Satake | |
| 7,425,937 B2 | 9/2008 | Inukai | |
| 7,567,222 B2 * | 7/2009 | Tanaka et al. | 345/7 |
| 7,791,571 B2 | 9/2010 | Ohtani et al. | |
| 7,812,809 B2 * | 10/2010 | Choi et al. | 345/102 |
| 7,839,356 B2 * | 11/2010 | Hagood et al. | 345/55 |
| 2005/0012097 A1 | 1/2005 | Yamazaki | |
| 2007/0279319 A1 | 12/2007 | Yamazaki et al. | |
| 2007/0279359 A1 | 12/2007 | Yoshida et al. | |
| 2007/0279374 A1 | 12/2007 | Kimura et al. | |
| 2009/0321737 A1 | 12/2009 | Isa et al. | |
| 2010/0148177 A1 | 6/2010 | Koyama et al. | |
| 2010/0177170 A1 * | 7/2010 | Kusuno | 348/51 |
| 2010/0182282 A1 | 7/2010 | Kurokawa et al. | |
| 2010/0225681 A1 * | 9/2010 | Yoshida et al. | 345/690 |
| 2010/0328438 A1 | 12/2010 | Ohyama et al. | |
| 2011/0063490 A1 * | 3/2011 | Ogita | 348/333.01 |
| 2011/0115839 A1 * | 5/2011 | Takahashi et al. | 345/698 |
| 2011/0122329 A1 | 5/2011 | Broughton et al. | |
| 2011/0234582 A1 | 9/2011 | Daiku et al. | |
| 2011/0242100 A1 | 10/2011 | Yamazaki et al. | |

FOREIGN PATENT DOCUMENTS

| | | |
|---|---|---|
| JP | 2003-259395 A | 9/2003 |
| JP | 2004-294914 A | 10/2004 |
| JP | 2005-258013 A | 9/2005 |
| JP | 2010-073881 A | 4/2010 |
| JP | 2010-128306 A | 6/2010 |
| JP | 2010-251156 A | 11/2010 |
| JP | 2011-013778 A | 1/2011 |

OTHER PUBLICATIONS

Sheat.D et al., "3-D Imaging Systems for Telecommunications Applications," Proceedings of SPIE, 1992, vol. 1669, pp. 186-192.

Sexton.I, "Parallax Barrier Display Systems," Oct. 1, 1992, 5 pages.

* cited by examiner

DISPLAY DEVICE AND METHOD FOR DRIVING THE SAME

BACKGROUND OF THE INVENTION

1. Field of the Invention

The present invention relates to display devices and methods for driving display devices, and particularly to a display device capable of displaying three-dimensional (3D) images and a method for driving the display device.

2. Description of the Related Art

Display devices are widely used, ranging from large display devices such as television devices to small display devices such as mobile phones. High value-added products will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy or image separation method), and autostereoscopy (a naked eye method) by which 3D images can be seen by the naked eye by addition of a structure for separating an image seen with a left eye and an image seen with a right eye in a display portion. It is not necessary to prepare glasses to see autostereoscopic 3D images, which offers a high convenience. Autostereoscopic 3D display is coming into widespread use such as mobile phones and mobile game consoles.

As a method for displaying autostereoscopic 3D images, there is known a parallax barrier method in which a parallax barrier is added to a display portion. A parallax barrier for this method is a stripe-shaped light-blocking portion and causes a decrease in resolution when display is switched from 3D display to two-dimensional (2D) display. In view of this, for a parallax barrier method, there is suggested a structure in which a liquid crystal panel having a patterned transparent electrode is used, and when display is switched between 2D display and 3D display, transmission or blocking of light by a liquid crystal layer is controlled by controlling voltage applied to the transparent electrode in order to set the presence or absence of a parallax barrier (see Patent Document 1).

REFERENCE

Patent Document 1: Japanese Published Patent Application No. 2005-258013

SUMMARY OF THE INVENTION

Since a parallax barrier blocks light emitted from a display portion, the luminance of light emitted from the display portion while the parallax barrier is formed needs to be increased in order to keep the display luminance of a display device constant. Further, in a region where letters and the like are displayed, the letters might be blurred by the formation of the parallax barrier, resulting in the decrease in display quality.

In view of the above, an object of one embodiment of the present invention is to suppress the increase in power consumption due to 3D display. Another object of one embodiment of the present invention is to suppress the decrease in display quality of a display device capable of displaying 3D images. Note that one embodiment of the present invention aims to achieve at least one of the above objects.

One embodiment of the present invention is a display device including a display portion that displays a moving image or a still image by using a plurality of pixels arranged in a matrix, and a shutter portion which is provided to face a display surface of the display portion and in which a plurality of optical shutters arranged in a matrix are independently controlled whether to transmit light. The shutter portion includes a liquid crystal whose alignment is controlled by an applied voltage, a plurality of first electrodes to which a light transmission signal or a light block signal is independently input, and a plurality of second electrodes to which a light transmission signal or a light block signal is independently input. Each of the optical shutters includes part of the liquid crystal, part of one of the first electrodes, and part of one of the second electrodes. The optical shutter is brought into a light-transmitting state when a light transmission signal is input to the first electrode and the second electrode, and is brought into a light-blocking state when a light block signal is input to at least one of the first electrode and the second electrode.

Another embodiment of the present invention is the above-described display device in which the optical shutter is brought into a light-blocking state when a light block signal is input to the first electrode and the second electrode, and is brought into a light-transmitting state when a light transmission signal is input to at least one of the first electrode and the second electrode.

In the display device according to one embodiment of the present invention, whether each of the optical shutters arranged in a matrix is brought into a light-transmitting state or a light-blocking state is selected in accordance with a voltage between a pair of electrodes (the first electrode and the second electrode) of the optical shutter. That is, by control of the voltage between the pair of electrodes, a parallax barrier can be selectively formed in an intended region. Thus, in the display device according to one embodiment of the present invention, a parallax barrier can be formed only in a region where 3D images are to be displayed. As a result, the increase in power consumption can be suppressed. In addition, the parallax barrier is not formed in a region where letters and the like are displayed, so that the decrease in display quality due to blur of the letters and the like can be suppressed.

DETAILED DESCRIPTION OF THE INVENTION

Embodiments of the present invention will be described below in detail. Note that the present invention is not limited to the description below, and a variety of changes can be made without departing from the spirit and scope of the present invention. Therefore, the present invention is not construed as being limited to the description given below.

(Structure Example of Display Device)

Figure 1A:
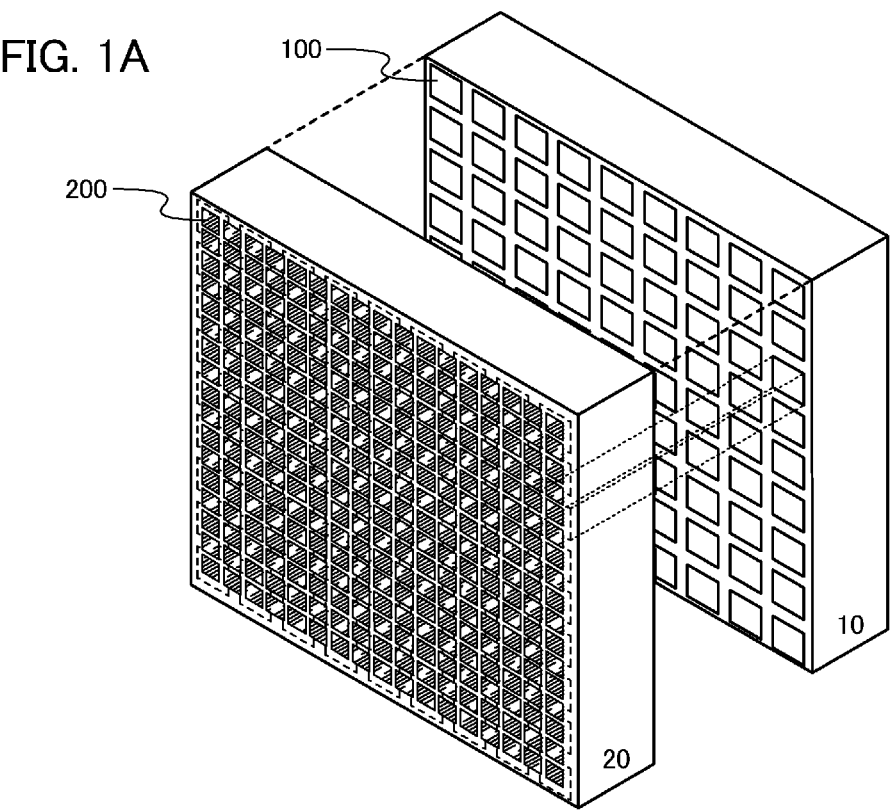
FIG. 1A illustrates an example of the structure of a display device.

FIG. 1A illustrates an example of the structure of a display device according to one embodiment of the present invention. The display device illustrated in FIG. 1A includes a display portion 10 and a shutter portion 20. In the display portion 10, a plurality of pixels 100 are arranged in a matrix. In the shutter portion 20, a plurality of optical shutters 200 are arranged in a matrix. The display device in FIG. 1A can display 3D images in such a manner that moving images or still images are displayed using the plurality of pixels 100 in the display portion 10 and a parallax barrier is formed in the shutter portion 20. Note that as illustrated in FIG. 1A, the width of the optical shutter 200 is preferably smaller than that of the pixel 100, in which case the flexibility of a parallax barrier to be formed is increased. Specifically, this structure is preferable when the display device includes a sensor for detecting a viewer and a parallax barrier is formed in accordance with the position of the viewer.

Note that as the display portion 10 in FIG. 1A, a panel that displays images by control of alignment of liquid crystals or a panel that displays images by organic electroluminescence (organic EL) can be used, for example.

Figure 1B:
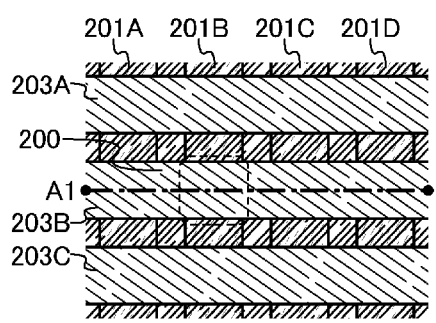
FIGS. 1B and 1C are a plan view and a cross-sectional view illustrating an example of the structure of a shutter portion.
Figure 1C:
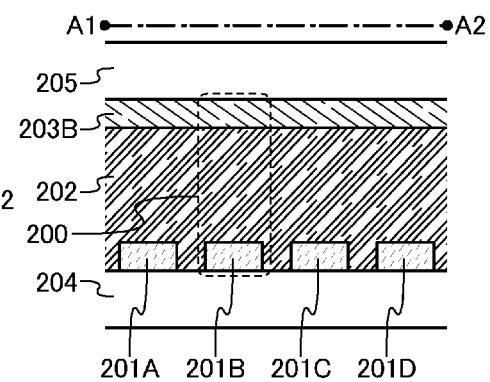

FIG. 1B is a plan view illustrating an example of the structure of part of the shutter portion 20, and FIG. 1C is a cross-sectional view along A1-A2 in FIG. 1B. The shutter portion 20 illustrated in FIGS. 1B and 1C includes a plurality of electrodes 201A to 201D provided over a substrate 204, a plurality of electrodes 203A to 203C provided on a substrate 205, and a liquid crystal 202 placed between the substrate 204 and the substrate 205. In the shutter portion 20 in FIGS. 1B and 1C, an optical shutter 200 is composed of part of one of the electrodes 201A to 201D provided over the substrate 204, part of one of the electrodes 203A to 203C provided on the substrate 205, and part of the liquid crystal 202 placed between the part of one of the electrodes 201A to 201D and the part of one of the electrodes 203A to 203C.

The electrodes 201A to 201D and the electrodes 203A to 203C are formed using a light-transmitting conductive material. For example, the electrodes 201A to 201D and the electrodes 203A to 203C can be formed using indium tin oxide containing silicon oxide, indium tin oxide, zinc oxide, indium zinc oxide, zinc oxide to which gallium is added, or the like.

As the liquid crystal 202, a known liquid crystal material can be freely used. Further, the liquid crystal 202 can freely employ a known alignment mode, for example, a twisted nematic (TN) mode, a super twisted nematic (STN) mode, a vertical alignment (VA) mode, or an optically compensated bend (or optically compensated birefringence: OCB) mode. Note that a polymer dispersed liquid crystal (PDLC) may be used. The shutter portion 20 can also include an alignment film, a polarization filter, or the like depending on the alignment mode.

The substrates 204 and 205 are formed using a light-transmitting material. For example, a glass substrate or a quartz substrate can be used as the substrates 204 and 205.

In the shutter portion 20 in FIGS. 1B and 1C, light transmission signals and light block signals are independently input to the plurality of electrodes 201A to 201D provided over the substrate 204 and the plurality of electrodes 203A to 203C provided on the substrate 205. Then, alignment of the liquid crystal is controlled by signals input to a pair of electrodes included in the optical shutter 200, thereby selecting whether the optical shutter 200 is brought into a light-transmitting state or a light-blocking state. Here, when a light transmission signal is input to one of the electrodes 201A to 201D and a light transmission signal is input to one of the electrodes 203A to 203C, the optical shutter 200 including the electrodes to which the light transmission signals are input is brought into a light-transmitting state. The optical shutter 200 is brought into a light-blocking state in other cases (i.e., when a light block signal is input to at least one of the pair of electrodes of the optical shutter). In such a manner, a parallax barrier with a desired shape can be formed in the shutter portion 20 by controlling signals input to the electrodes 201A to 201D provided over the substrate 204 and the electrodes 203A to 203C provided on the substrate 205.

Figure 2A:
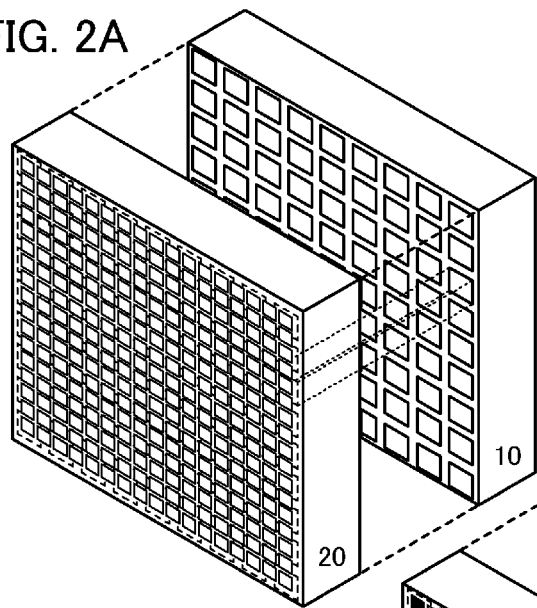
FIGS. 2A to 2C are schematic diagrams each illustrating a specific example of a parallax barrier formed in a shutter portion.
Figure 2B:
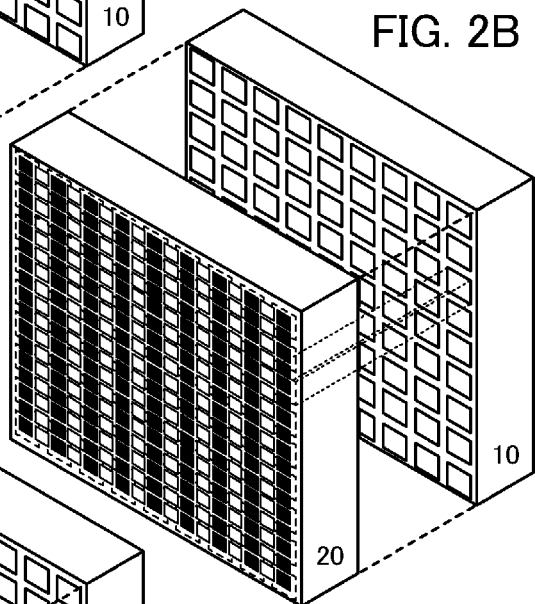
Figure 2C:
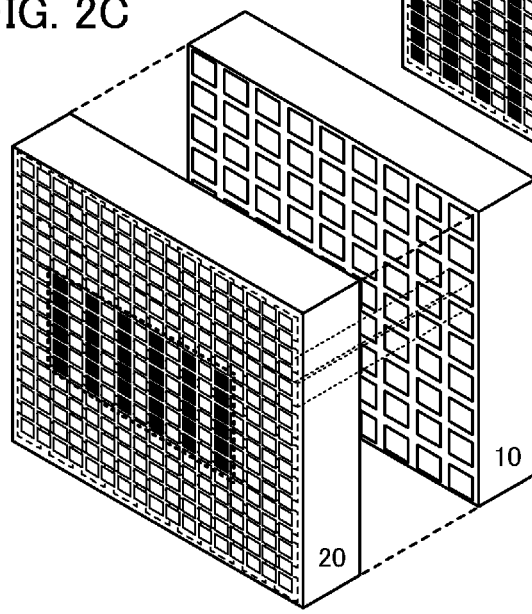

FIGS. 2A to 2C are schematic diagrams each illustrating a specific example of a parallax barrier formed in the shutter portion 20 illustrated in FIGS. 1A to 1C. In FIGS. 2A to 2C, a white optical shutter 200 indicates that it is in a light-transmitting state, and a black optical shutter 200 indicates that it is in a light-blocking state.

FIG. 2A is a schematic diagram illustrating that all the plurality of optical shutters 200 arranged in a matrix are in a light-transmitting state. FIG. 2A illustrates a state in which a 2D image is displayed using all the plurality of pixels 100 placed in the display portion 10.

FIG. 2B is a schematic diagram illustrating that a stripe-shaped parallax barrier is formed. Specifically, FIG. 2B is a schematic diagram showing a state where among the plurality of optical shutters 200 arranged in a matrix, optical shutters 200 in some columns are all in a light-transmitting state and optical shutters 200 in the other columns are all in a light-blocking state. FIG. 2B illustrates a state in which a 3D image is displayed using all the plurality of pixels 100 placed in the display portion 10.

FIG. 2C is a schematic diagram illustrating that a parallax barrier is partly formed. Specifically, FIG. 2C is a schematic diagram showing a state where among the plurality of optical shutters 200 arranged in a matrix, optical shutters 200 in some columns are all in a light-transmitting state, some of optical shutters 200 in the other columns are in a light-transmitting state, and the other optical shutters 200 in the other columns are in a light-blocking state. FIG. 2C illustrates a state in which a 2D image is displayed using some of the pixels 100 placed in the display portion 10 and a 3D image is displayed using the other pixels 100.

In the above-described display device, whether each of the optical shutters arranged in a matrix is brought into a light-transmitting state or a light-blocking state is selected in accordance with signals input to a pair of electrodes of each optical shutter. That is, by control of the signals, a parallax barrier can be selectively formed in an intended region. Thus, in the display device, a parallax barrier can be formed only in a region where 3D images are to be displayed. As a result, the increase in power consumption can be suppressed. In addition, the parallax barrier is not formed in a region where letters and the like are displayed, so that the decrease in display quality due to blur of the letters and the like can be suppressed.

Note that the shutter portion 20 included in the display device can be configured so that the optical shutter 200 is brought into a light-blocking state when a light block signal is input to both of the pair of electrodes of the optical shutter 200 and is brought into a light-transmitting state when a light-transmitting signal is input to at least one of the pair of electrodes.

Further, the shutter portion 20 included in the display device can have a structure in which both of the pair of electrodes of the optical shutter 200 is formed over one substrate.

FIGS. 3A and 3B and FIGS. 4A and 4B each illustrate an example of the structure of a driver circuit that outputs signals to a plurality of electrodes provided in the shutter portion 20.

Figure 3A:
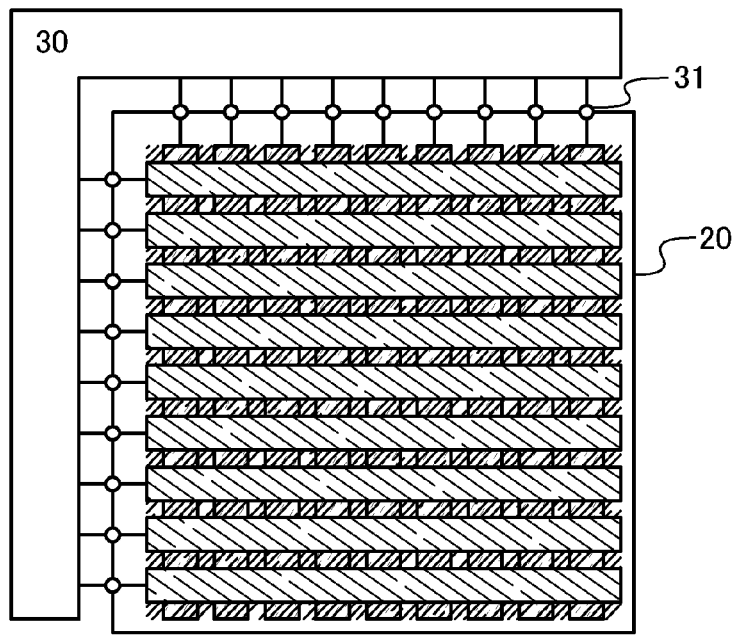
FIGS. 3A and 3B each illustrate an example of the structure of a driver circuit that outputs signals to a plurality of electrodes.

A driver circuit 30 illustrated in FIG. 3A is provided outside the shutter portion 20. The driver circuit 30 outputs signals directly to the plurality of electrodes provided in the shutter portion 20 through connection terminals 31. Note that the driver circuit 30 can be a circuit formed using a single crystal silicon substrate or the like.

Figure 3B:
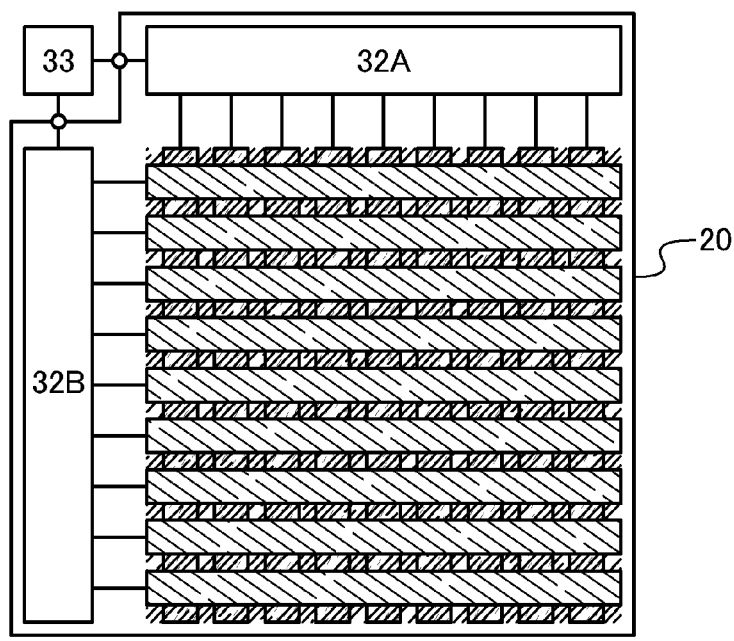

Driver circuits 32A and 32B illustrated in FIG. 3B are incorporated into the shutter portion 20. The driver circuits 32A and 32B output signals to the plurality of electrodes provided in the shutter portion 20 in accordance with signals input from an external circuit 33. Note that the driver circuits 32A and 32B can be constituted by thin film transistors or the like.

The structure in FIG. 3A can reduce the total number of steps for fabricating the display device, compared with the structure in FIG. 3B. Thus, the fabrication costs of the display device can be reduced. On the other hand, the structure in FIG. 3B can increase the number of electrodes included in the shutter portion 20, compared with the structure in FIG. 3A. Specifically, in the structure in FIG. 3A, the number of connection terminals 31 needs to be the same as that of electrodes included in the shutter portion 20. This means that the number of connection terminals that can be provided in the shutter portion 20 is the maximum number of electrodes included in the shutter portion 20. In contrast, in the structure in FIG. 3B, the number of electrodes can be increased without being limited by the number of connection terminals capable of being provided. Consequently, in the structure in FIG. 3B, the plurality of electrodes provided in the shutter portion 20 can be reduced in size, which leads to the increase in the flexibility of a parallax barrier formed in the shutter portion 20.

Figure 4A:
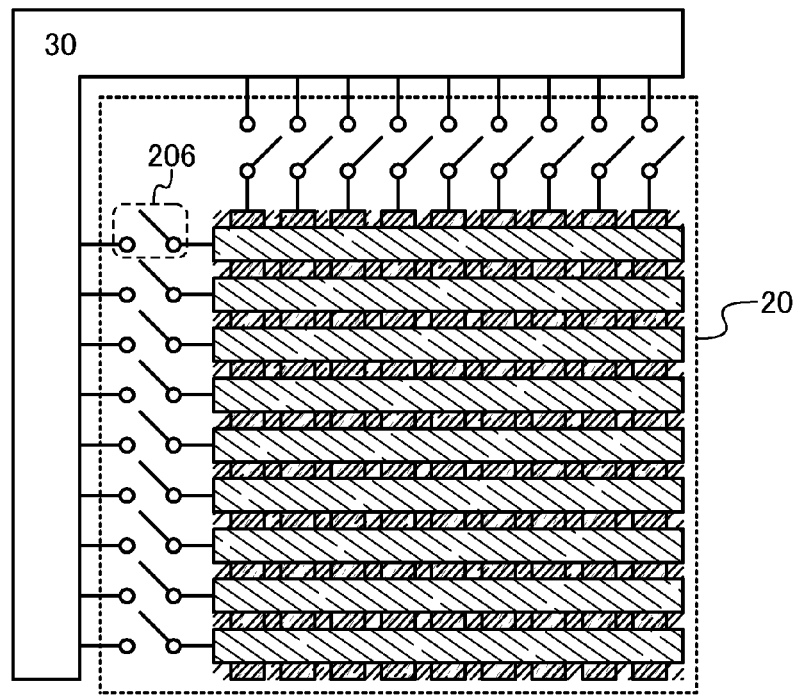
FIGS. 4A and 4B each illustrate an example of the structure of a driver circuit that outputs signals to a plurality of electrodes.

The driver circuit 30 illustrated in FIG. 4A is provided outside the shutter portion 20. The driver circuit 30 outputs signals to the plurality of electrodes provided in the shutter portion 20 through switches 206. In other words, FIG. 4A illustrates the structure in which the switches 206 are provided between the plurality of electrodes and the driver circuit 30 in the structure in FIG. 3A.

Figure 4B:
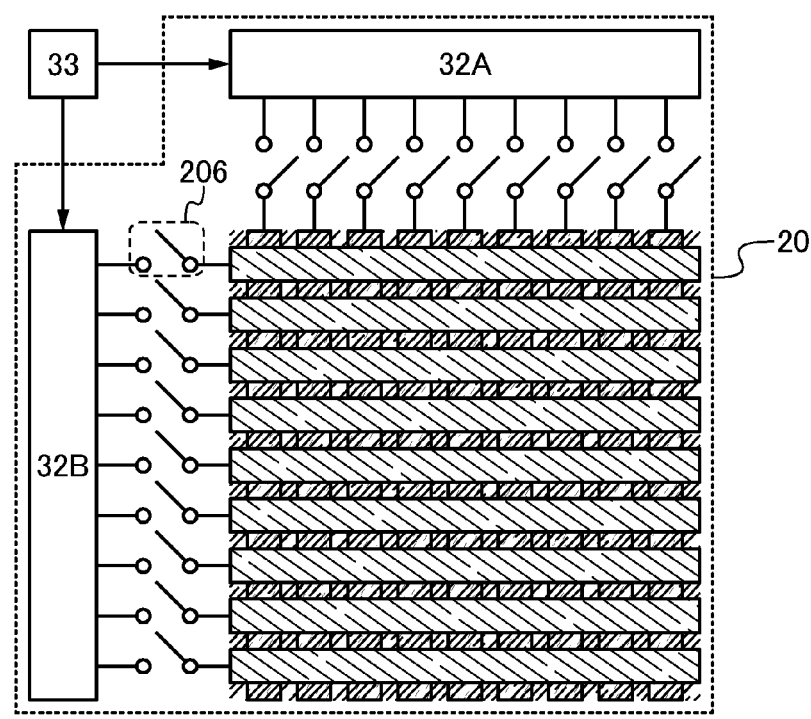

The driver circuits 32A and 32B illustrated in FIG. 4B are incorporated into the shutter portion 20. The driver circuits 32A and 32B output signals to the plurality of electrodes provided in the shutter portion 20 through the switches 206 in accordance with signals input from the external circuit 33. In other words, FIG. 4B illustrates the structure in which the switches 206 are provided between each electrode and the driver circuit 32A and between each electrode and the driver circuit 32B in the structure in FIG. 3B. In the structure in FIG. 4B, a thin film transistor used for forming the driver circuits 32A and 32B can also be used as the switch 206.

As the thin film transistors included in the driver circuits 32A and 32B in FIG. 3B, the switch 206 in FIG. 4A, and the thin film transistors included in the driver circuits 32A and 32B and the switch 206 in FIG. 4B, it is possible to use, for example, a thin film transistor whose channel is formed in a semiconductor layer containing an element that belongs to Group 14 of the periodic table (e.g., silicon or germanium) or a semiconductor layer containing an oxide that exhibits semiconductor properties (such an oxide is also referred to as an oxide semiconductor, and such a semiconductor layer is also referred to as an oxide semiconductor layer).

Note that an oxide semiconductor has a wide band gap and low intrinsic carrier density; consequently, the off-state current of a thin film transistor whose channel is formed in an oxide semiconductor layer can be extremely low.

When the display device in FIG. 1A displays moving images, the display portion 10 needs to be constantly operated in order to display moving images, whereas the shutter portion 20 needs to be operated at regular or irregular intervals in accordance with switching between 3D display and 2D display. As a result, a period during which the shutter portion 20 needs to be operated is much shorter than a period during which the shape of a parallax barrier formed in the shutter portion 20 is maintained. For that reason, in the period during which the shape of the parallax barrier formed in the shutter portion 20 is maintained, it is preferable to stop supply of the power supply voltage to a driver circuit that outputs signals to the plurality of electrodes included in the shutter portion 20 because power consumption can be reduced. Note that when supply of the power supply voltage to the driver circuit is stopped, the potentials of the plurality of electrodes might vary and the probability that the shape of the parallax barrier is not maintained is increased.

Figure 5:
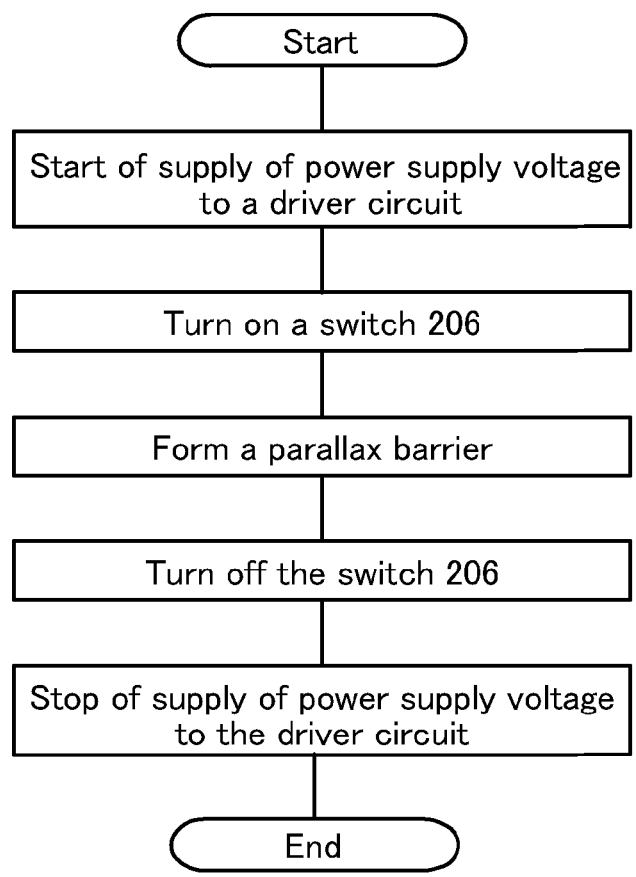
FIG. 5 illustrates an example of the operation of a display device.

In contrast, with the structure in which a thin film transistor whose channel is formed in an oxide semiconductor layer (a thin film transistor with extremely low off-state current) is used as the switch 206 in the shutter portion 20 as illustrated in FIGS. 4A and 4B, variations in the potentials of the plurality of electrodes can be reduced even when supply of the power supply voltage to the driver circuit is stopped. Specifically, the display device with this structure can perform operations illustrated in FIG. 5. As illustrated in FIG. 5, in the display device with this structure, the power supply voltage can be supplied to the driver circuit only in a period including before and after a period when a parallax barrier is formed or when the shape of a parallax barrier is changed, and supply of the power supply voltage to the driver circuit can be stopped in the other periods. In the case where a period during which the shape of a parallax barrier is maintained is long, the power supply voltage can be supplied to the driver circuit at regular intervals or at random and signals for forming a parallax barrier of the same shape (signals for maintaining the existing parallax barrier) can be output to the plurality of electrodes.

EXAMPLE 1

Examples of electronic devices that can include a display device according to one embodiment of the present invention are a mobile phone, a portable game console, a personal digital assistant, an e-book reader, a video camera, and a digital still camera. Specific examples of such electronic devices will be described with reference to FIGS. 6A and 6B.

Figure 6A:
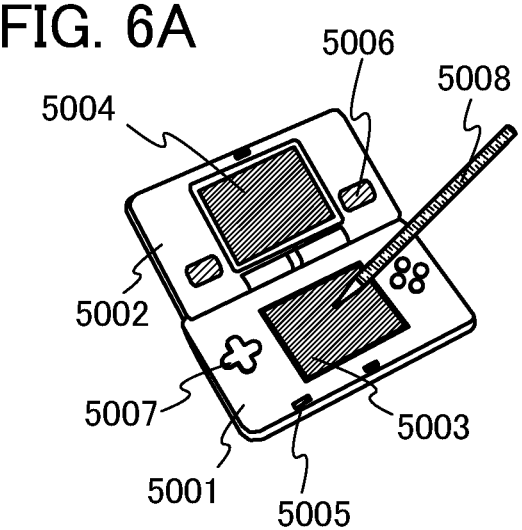
FIGS. 6A and 6B each illustrate a specific example of an electronic device.

FIG. 6A illustrates a portable game console including a housing 5001, a housing 5002, a display portion 5003, a display portion 5004, a microphone 5005, a speaker 5006, an operation key 5007, a stylus 5008, and the like. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Note that although the portable game console in FIG. 6A has the two display portions 5003 and 5004, the number of display portions included in the portable game console is not limited to two.

Figure 6B:
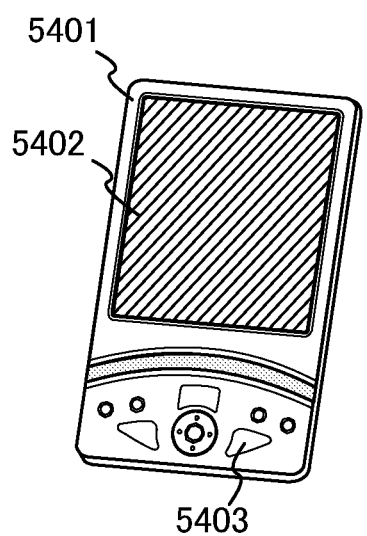

FIG. 6B illustrates a personal digital assistant including a housing 5401, a display portion 5402, an operation key 5403, and the like. The display device according to one embodiment of the present invention can be used as the display portion 5402. By using the display device according to one embodiment of the present invention as the display portion 5402, it is possible to provide a highly convenient personal digital assistant capable of displaying 3D images.

This application is based on Japanese Patent Applications serial No. 2011-133333 filed with Japan Patent Office on Jun. 15, 2011, the entire contents of which are hereby incorporated by reference.

What is claimed is:

1. A display device comprising:
   a plurality of switches;
   a driver circuit;
   a display portion comprising a plurality of pixels arranged in a matrix; and
   a shutter portion over a display surface of the display portion, the shutter portion comprising first to fourth stripe shaped electrodes, and a liquid crystal layer,
   wherein each of the first and second stripe shaped electrodes intersects with the third and fourth stripe shaped electrodes,
   wherein each of first to fourth optical shutters comprises a first electrode, a second electrode, and the liquid crystal layer interposed between the first electrode and the second electrode,
   wherein the first electrode of the first and second optical shutters is a part of the first stripe shaped electrode,
   wherein the first electrode of the third and fourth optical shutters is a part of the second stripe shaped electrode,
   wherein the second electrode of the first and third optical shutters is a part of the third stripe shaped electrode,
   wherein the second electrode of the second and fourth optical shutters is a part of the fourth stripe shaped electrode,
   wherein one of the plurality of switches is provided between the driver circuit and the first electrode of one of the first to fourth optical shutters, and
   wherein each of the first to fourth optical shutters is configured to be brought into a light-blocking state when a first light block signal is input to the first electrode or a second light block signal is input to the second electrode.

2. The display device according to claim 1,
   wherein a width of the first electrode and a width of the second electrode are smaller than a width of one of the plurality of pixels.

3. The display device according to claim 1, further comprising:
   a first substrate where the first electrode is provided; and
   a second substrate where the second electrode is provided,
   wherein the liquid crystal layer is placed between the first substrate and the second substrate.

4. The display device according to claim 1, further comprising a substrate,
   wherein the first electrode and the second electrode are provided over the substrate.

5. The display device according to claim 1,
   wherein the driver circuit is included in the shutter portion.

6. The display device according to claim 1,
   wherein each of the plurality of switches is a transistor whose channel is formed in an oxide semiconductor layer.

7. A display device comprising:
   a plurality of switches;
   a driver circuit;
   a display portion comprising a plurality of pixels arranged in a matrix; and
   a shutter portion over a display surface of the display portion, the shutter portion comprising first to fourth stripe shaped electrodes, and a liquid crystal layer,
   wherein each of the first and second stripe shaped electrodes intersects with the third and fourth stripe shaped electrodes,
   wherein each of first to fourth optical shutters comprises a first electrode, a second electrode, and the liquid crystal layer interposed between the first electrode and the second electrode,
   wherein the first electrode of the first and second optical shutters is a part of the first stripe shaped electrode,
   wherein the first electrode of the third and fourth optical shutters is a part of the second stripe shaped electrode,
   wherein the second electrode of the first and third optical shutters is a part of the third stripe shaped electrode,
   wherein the second electrode of the second and fourth optical shutters is a part of the fourth stripe shaped electrode,
   wherein one of the plurality of switches is provided between the driver circuit and the first electrode of one of the first to fourth optical shutters, and
   wherein each of the first to fourth optical shutters is configured to be brought into a light-blocking state when a first light block signal is input to the first electrode and a second light block signal is input to the second electrode.

8. The display device according to claim 7,
   wherein a width of the first electrode and a width of the second electrode are smaller than a width of one of the plurality of pixels.

9. The display device according to claim 7, further comprising:
   a first substrate where the first electrode is provided; and
   a second substrate where the second electrode is provided,
   wherein the liquid crystal layer is placed between the first substrate and the second substrate.

10. The display device according to claim 7, further comprising a substrate,
    wherein the first electrode and the second electrode are provided over the substrate.

11. The display device according to claim 7,
    wherein the driver circuit is included in the shutter portion.

12. The display device according to claim 7,
    wherein each of the plurality of switches is a transistor whose channel is formed in an oxide semiconductor layer.

13. A driving method of a display device comprising a display portion comprising a plurality of pixels arranged in a matrix, a shutter portion provided over a display surface of the display portion and comprising first to fourth stripe shaped electrodes and a liquid crystal layer, a driver circuit, and a plurality of switches,
    wherein each of the first and second stripe shaped electrodes intersects with the third and fourth stripe shaped electrodes,
    wherein each of first to fourth optical shutters comprises a first electrode, a second electrode, and the liquid crystal layer interposed between the first electrode and the second electrode,
    wherein the first electrode of the first and second optical shutters is a part of the first stripe shaped electrode,
    wherein the first electrode of the third and fourth optical shutters is a part of the second stripe shaped electrode,
    wherein the second electrode of the first and third optical shutters is a part of the third stripe shaped electrode,
    wherein the second electrode of the second and fourth optical shutters is a part of the fourth stripe shaped electrode, and
    wherein one of the plurality of switches is provided between the driver circuit and the first electrode of one of the first to fourth optical shutters or between the driver circuit and the second electrode of one of the plurality of first to fourth optical shutters, the driving method comprising the steps of:

turning on the plurality of switches;

inputting a first light block signal to the first electrode and a second light block signal to the second electrode so that the first to fourth optical shutters into which the first light block signal and the second light block signal are input are brought into a light-blocking state, whereby forming a parallax barrier in the shutter portion; and turning off the plurality of switches, wherein the parallax barrier remains for a while after the step of turning off the plurality of switches.

14. The driving method according to claim 13, wherein the parallax barrier is formed in part of the shutter portion.

15. The driving method according to claim 13, wherein each of the plurality of switches is a transistor whose channel is formed in an oxide semiconductor layer.

16. The driving method according to claim 13, wherein the driver circuit is provided outside the shutter portion.

17. The driving method according to claim 13, wherein the display device further comprises a substrate, and wherein the first electrode and the second electrode are provided over the substrate.

\* \* \* \* \*

UNITED STATES PATENT AND TRADEMARK OFFICE
CERTIFICATE OF CORRECTION

| | | |
|---|---|---|
| PATENT NO. | : 9,024,927 B2 | Page 1 of 1 |
| APPLICATION NO. | : 13/483076 | |
| DATED | : May 5, 2015 | |
| INVENTOR(S) | : Jun Koyama | |

It is certified that error appears in the above-identified patent and that said Letters Patent is hereby corrected as shown below:

In claim 13, at column 9, lines 2-3, "one of the plurality of first to fourth" should be --one of the first to fourth--.

Signed and Sealed this
First Day of March, 2016

Michelle K. Lee
*Director of the United States Patent and Trademark Office*